(12) United States Patent
Bardaji Zuriarrain et al.

(10) Patent No.: US 7,351,299 B2
(45) Date of Patent: Apr. 1, 2008

(54) DEVICE AND PROCESS FOR STORING AND TRANSFERRING STRIP-SHAPED PRODUCTS FOR USE IN MAKING A TIRE COVER

(75) Inventors: Fidel Aitor Bardaji Zuriarrain, Valladolid (ES); Tomas Saez De Ibarra Ortiz De Landaluce, Vitoria (ES)

(73) Assignee: Michelin Recherche et Technique S.A., Granges-Paccot (CH)

( * ) Notice: Subject to any disclaimer, the term of this patent is extended or adjusted under 35 U.S.C. 154(b) by 437 days.

(21) Appl. No.: 10/971,016

(22) Filed: Oct. 25, 2004

(65) Prior Publication Data

US 2005/0115659 A1    Jun. 2, 2005

Related U.S. Application Data

(63) Continuation of application No. PCT/EP03/03725, filed on Apr. 23, 2003.

(30) Foreign Application Priority Data

Apr. 25, 2002  (FR) .................................. 02 05241

(51) Int. Cl.
   *B29D 30/30* (2006.01)
   *B29D 30/16* (2006.01)
(52) U.S. Cl. .................... 156/111; 156/123; 156/405.1; 156/406; 156/406.4
(58) Field of Classification Search ............. 156/405.1, 156/406, 406.4, 111, 396, 353, 577; 242/364.11, 242/528, 533.2, 533.8, 598.2; 271/3.21; 100/210
See application file for complete search history.

(56) References Cited

U.S. PATENT DOCUMENTS

| | | | | |
|---|---|---|---|---|
| 2,039,532 | A | * | 5/1936 | Heston ........................ 156/395 |
| 3,071,179 | A | | 1/1963 | Tourtelltte et al. |
| 3,591,439 | A | | 7/1971 | Jean et al. |
| 3,654,828 | A | | 4/1972 | Jean et al. |
| 3,775,219 | A | * | 11/1973 | Karlson et al. ............. 156/363 |
| 3,795,563 | A | * | 3/1974 | Enders et al. ............... 156/406 |
| 4,149,926 | A | * | 4/1979 | Taylor ..................... 156/406.4 |
| 4,296,514 | A | | 10/1981 | Dokoupil et al. |
| 4,306,682 | A | * | 12/1981 | Toussaint .................... 239/745 |
| 4,504,337 | A | | 3/1985 | Askam et al. |
| 4,591,402 | A | * | 5/1986 | Evans et al. ................. 156/350 |
| 4,659,417 | A | | 4/1987 | Yamamoto |
| 4,732,640 | A | * | 3/1988 | Goodfellow ................ 156/396 |
| 4,877,468 | A | | 10/1989 | Siegenthaler |
| 6,039,826 | A | | 3/2000 | Okada |

FOREIGN PATENT DOCUMENTS

DE   25 07 726   9/1976
DE   27 40 609   3/1979

* cited by examiner

*Primary Examiner*—Geoffrey L. Knable
(74) *Attorney, Agent, or Firm*—Buchanan Ingersoll & Rooney PC (57) ABSTRACT

A device for storing and transferring strip sections of rubber produced intended for making a tire cover, includes a storage cylinder mounted to rotate about a horizontal axis of revolution on a frame which is in turn mounted on a support. A flexible strip forming a closed loop is movable around part of the cylinder. The cylinder and the flexible strip are suitable for clamping a strip section between one another. The frame is mounted to rotate on the support about a second axis oriented perpendicular to the axis of revolution of the storage cylinder.

15 Claims, 10 Drawing Sheets

DEVICE AND PROCESS FOR STORING AND TRANSFERRING STRIP-SHAPED PRODUCTS FOR USE IN MAKING A TIRE COVER

This application is a continuation of International Application PCT/EP03/03725 filed on Apr. 23, 2003 and which claims priority from patent application Ser. No. 02/05241 filed in France on Apr. 25, 2002.

BACKGROUND

The invention relates to a device and process for handling strip-shaped products in order to use them to make a cover.

To make a cover of this kind, various different products are used, and these are initially stored in the form of continuous strips wound onto storage bobbins arranged in supply stations. These strips are unwound and then cut into sections of predetermined length. The various sections are then wound around a building drum by being deposited one after the other.

Moreover, once some pairs of products are laid on the building drum, they are symmetrical with respect to a plane perpendicular to the axis of rotation of the drum and passing through the centre of the drum. If the intention is to obtain the two sections from a single strip coming from a single supply station, then before depositing one of the two product sections onto the drum it has to be pivoted by 180° about an axis perpendicular to the plane of this same product section, which is laid flat, to obtain a section which is symmetrical with respect to the section which does not undergo this pivoting. Once they are deposited, one after the other, on the left-hand and right-hand sides of the building drum, the two product sections then have the desired symmetry.

The products referred to above may be rubber profiles, rubber strips or indeed plies formed from a rubber mix in which textile threads or metal cords are embedded, arranged parallel to one another and forming a defined angle with the longitudinal direction of the ply, these plies being called for example "carcass reinforcement plies" or "belt plies", depending on their position within the tyre.

Taking into account in particular the large number of different products to be laid, the mass and volume of the ply sections, when making tyres of large dimensions, such as those intended for construction machinery or agricultural vehicles, most of the operations (comprising unwinding continuous strips from their respective supply stations, cutting them off to form sections, turning them and transferring the said sections to the building drum) remain manual to date and are somewhat onerous.

To automate these operations and to improve ergonomics, a large number of technological solutions may be implemented.

Thus, it is possible to envisage the cooperation of a laying drum, which is movable in the direction transverse with respect to the direction in which the products are unwound and comes into position on demand along the axis of servers, which are generally fixed, each comprising a strip-unwinding system, with a cutting system and a transfer system. These principles are disclosed for example in U.S. Pat. No. 3,654,828.

However, this solution has the result that the number of cutting and transfer systems are multiplied, which substantially increases the cost of an installation of this kind. Another approach, which is particularly advantageous, consists in installing one or more movable assemblies carrying out the cutting and then the transfer of the strip sections from the fixed unwinding stations of each of the products to a fixed laying drum. A description of this kind of device can be found, by way of example, in U.S. Pat. No. 4,504,337.

Because of the great length of the sections to be handled, these transfer assemblies generally make use of storage cylinders around which the section to be transferred is wound before being deposited on the laying drum. Cylinders of this kind, which may be fixed or movable, are disclosed in DE 27 40 609, U.S. Pat. No. 3,591,439 or indeed U.S. Pat. No. 3,654,828. The product is kept wound around the outer surface of the cylinder either by a pneumatic device establishing a negative pressure between the sole of the product and the surface of the cylinder or by a set of electromagnetic devices, where the products contain metal elements.

However, these systems are ill suited to handling sections of several meters weighing several tens of kilos, as is often the case for making tyres intended for construction machinery or agricultural equipment. Moreover, the products whereof the final positions on the drum are symmetrical, are unwound from two separate supply stations, which tends to increase the number of stations and the size of the installation.

The object of the invention is specifically to find a solution which is highly flexible to use in the handling of strip sections of great mass and length.

SUMMARY OF INVENTION

To this end, the invention relates to a storage and transfer device which is particularly suitable for storing product sections of high mass, comprising a storage cylinder mounted to rotate about a horizontal axis of revolution on a frame which is in turn mounted on a support, characterised in that it has a flexible strip, forming a closed loop and circulating around part of the cylinder, and a set of guides integrally formed on the frame, with the cylinder and the flexible strip being suitable for clamping the strip section to be transferred.

Moreover, the frame of this device may be mounted to rotate on the support about a second axis perpendicular to the axis of revolution of the storage cylinder, which therefore enables the strip section to be turned by pivoting it by 180° before it is deposited on the building drum.

BRIEF DESCRIPTON OF DRAWINGS.

The present description is intended to give non-restrictive details of a transfer and storage device and an installation having a device of this kind in accordance with the invention, and to present variant embodiments allowing use to be adapted to various products or configurations of installations, this description being given with reference to the attached drawings, in which.

In the text below, like reference numerals designate like elements illustrated in FIGS. 1 to 11.

DETAILED DESCRIPTION OF A PREFERRED EMBODIMENT OF THE INVENTION.

Figure 1:
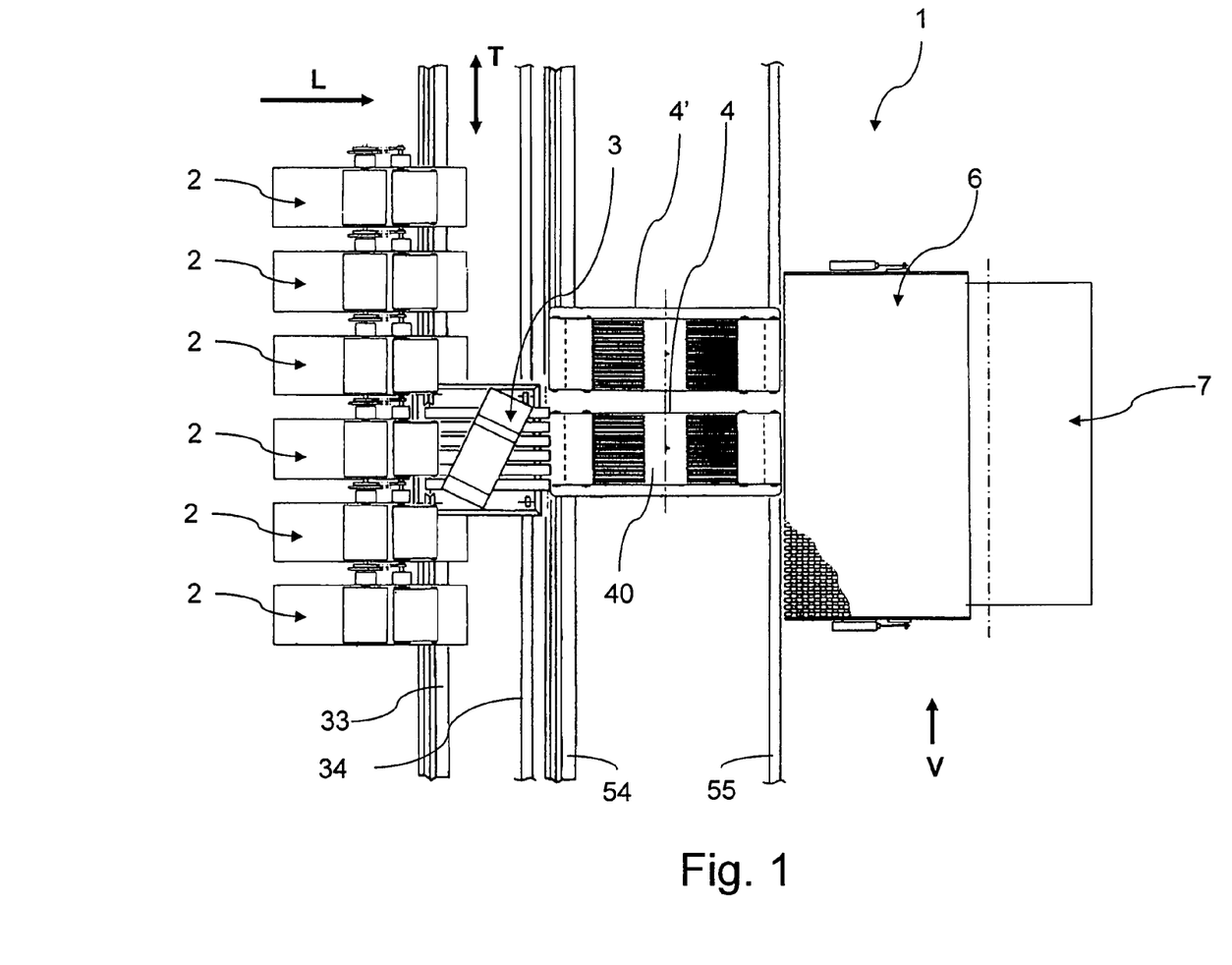
FIG. 1 is a plan or view from above of an installation having a device according to the invention.

The installation (1) as shown in FIG. 1 has, in the variant embodiment selected, a plurality of adjacent supply stations (2) which are arranged in a direction (T) perpendicular with respect to the direction of supply (L). A cutting device (3), which is movable in the transverse direction (T), is displaced on rails (33 and 34) to come into position on demand in front of one of the supply stations (2). A storage and transfer device (4) having a storage cylinder (40) is displaceable in translation on rails (54 and 55) in a direction perpendicular to the direction of supply in order to be brought successively opposite the cutting device (3) and then opposite a tire building site which includes a receiving station (6) positioned upstream of a building drum (7).

Figure 2:
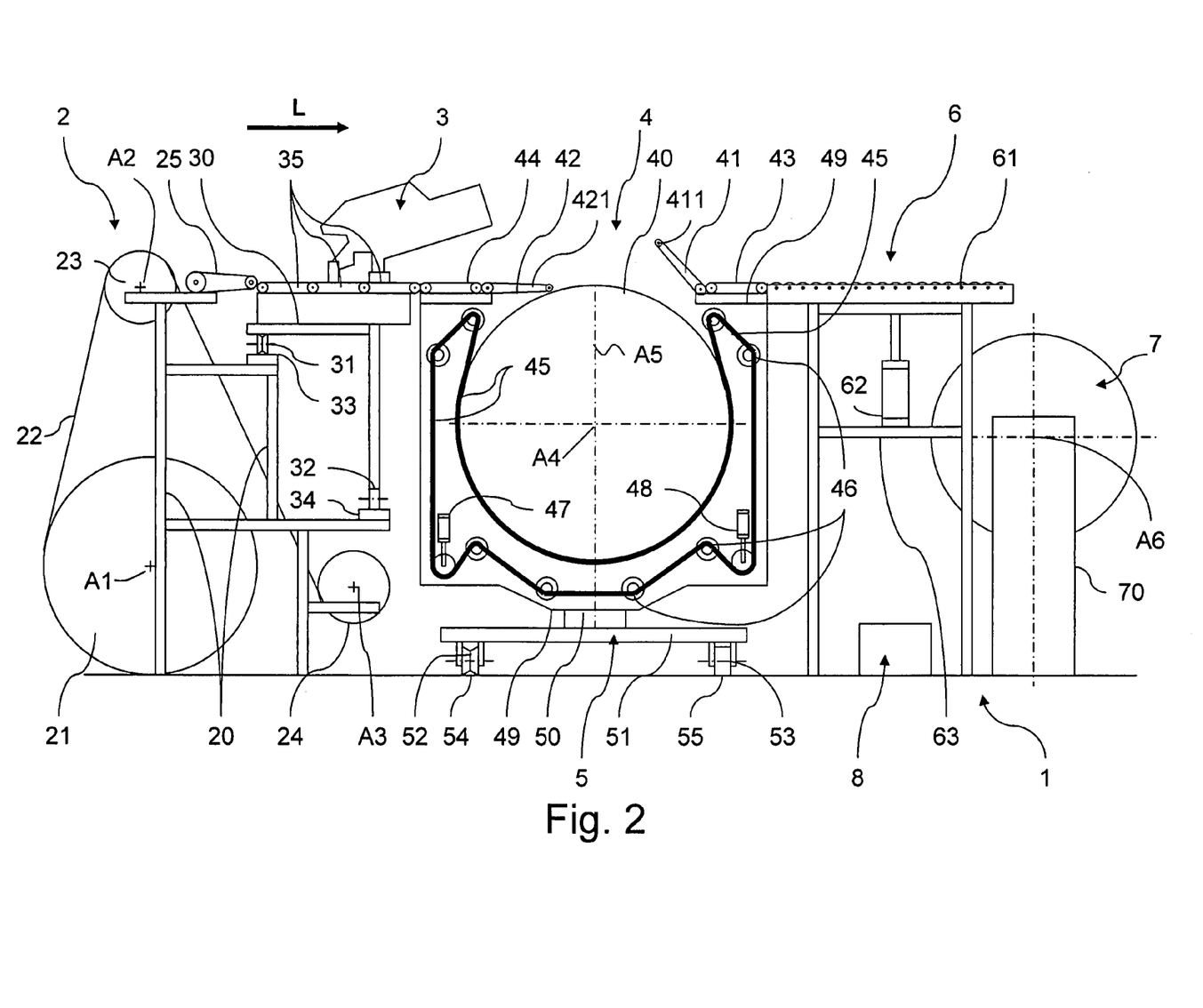
FIG. 2 is a side view or elevation of the installation of FIG. 1, in a direction indicated in FIG. 1 by the arrow V; here, the installation is shown empty, that is to say without any product to lay.

FIG. 2 shows in detail the way each of these members is arranged.

The supply station (2) comprises a frame (20) on which is mounted a bobbin (21) for storing a product in the form of a continuous strip supported by a backing element (22); the storage bobbin is driven by a motor (not illustrated) about a horizontal axis A1 perpendicular with respect to the direction of supply L. The backing element (22) is unwound about a first separating roll (23) which is mounted to rotate on the frame (20) about an axis A2 parallel to A1, and ends by being wound around a recovery spool (24) which is also mounted on the frame (20), rotating about an axis A3 parallel to A1 and A2. A conveyor belt (25) mounted on the frame (20) allows the product strip to be received and guided at the exit point from the separating roll.

In the variant embodiment presented, the cutting tool (3) is mounted on a movable carriage (30) having guide wheels (31) and motorised wheels (32) and is displaced in the transverse direction (T) on a rail (33) and a roll track (34) mounted on the frame (20). A set of conveyor belts (35) integrally formed on the carriage (30) allows the product strip to be guided across the cutting device. A measuring system (not illustrated) allows the length of unwound strip to be determined precisely and the cutting to be controlled in order to obtain a product section of the desired length. The cutting tool is adapted to the nature of the product to be cut.

The transfer and storage device (4) comprises a storage cylinder (40) mounted to rotate on a frame (49) about a horizontal axis A4 which is perpendicular to the direction of supply (L) This cylinder is surrounded by a flexible strip (45) forming a closed loop and circulating on a set of guides (46) mounted on the frame (49) along axes parallel to the axis A4. This set of guides may for example be formed by a set of pulleys.

The part of the cylinder (40) surrounded by the flexible strip located on the lower part thereof forms an angular opening of preferably between 180° and 240°. The complementary part of the cylinder located in the upper portion of the cylinder (40) is left free. In all cases, the diameter of the cylinder (40) and the length of the part of the circumference thereof in contact with the flexible strip will have to be determined such that this length is greater than the length of the product sections to be handled.

The cylinder (40) is driven by a motor (not illustrated), and when it rotates about its axis of revolution A4 it can drive the flexible strip (45) by friction in the manner of a driving pulley. The cylinder and the flexible strip are suitable for jointly driving by friction a section of product strip held between them in order to wind this section around the cylinder.

A tensioning system (47, 48) ensures constant tension of the flexible strip and allows product sections of variable thickness and mass to be held without deforming them. This system may be in the form of pneumatic jacks acting on the axes of pulleys selected for this purpose and mounted to slide in apertures, or indeed by calibrated weights.

Figure 5:
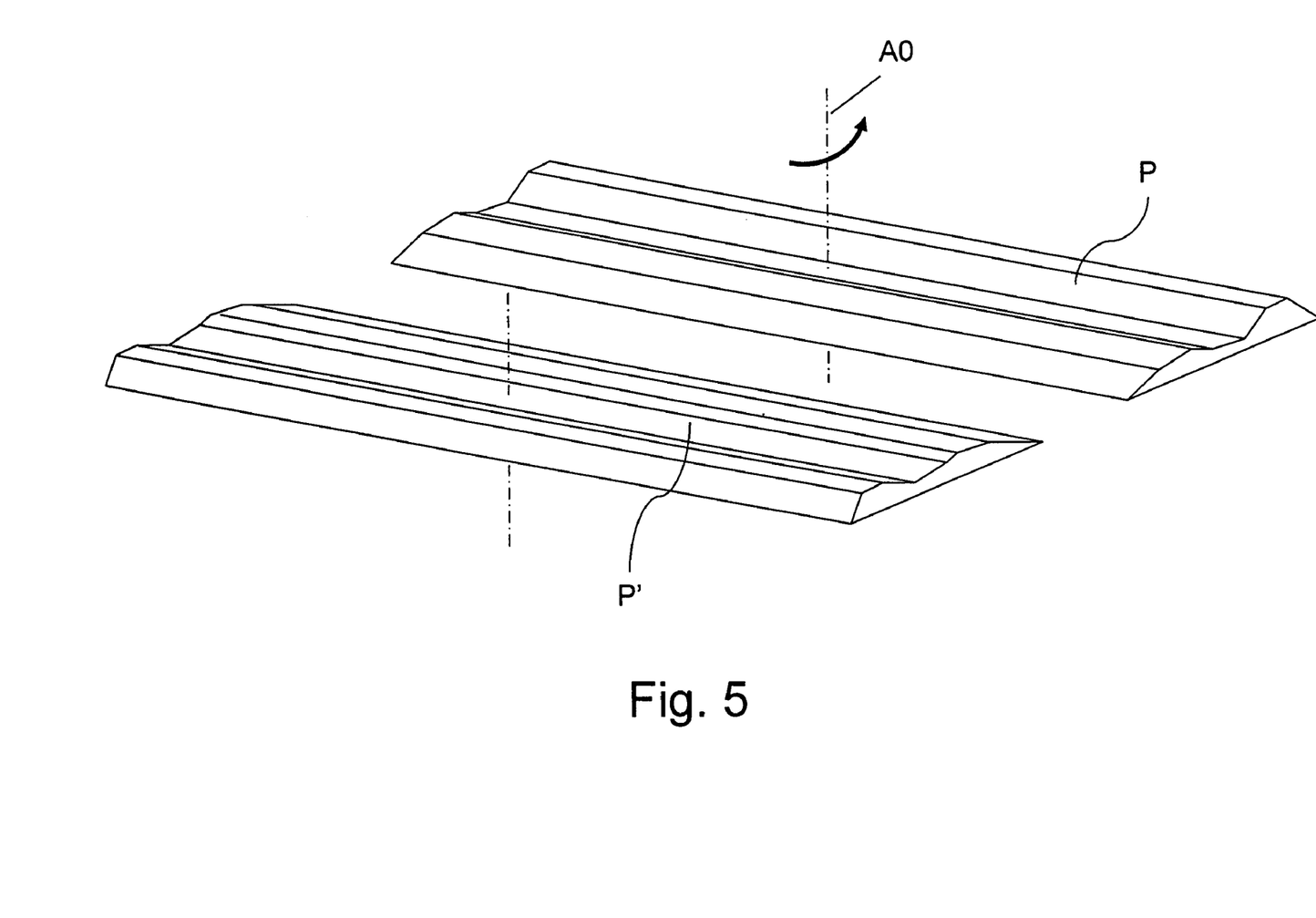
FIG. 5 illustrates a diagrammatic view of a strip section before and after it has been turned.

In the example embodiment illustrated, the frame (49) of this device is mounted to rotate on a support (50) about a second axis (A5) which is vertical and perpendicular with respect to the axis of revolution (A4) of the storage cylinder, passing through the mid-line of the storage cylinder. In this way, it becomes possible, by pivoting by 180° about the axis A5, to turn the strip section before depositing it on the building drum. FIG. 5 shows in detail the position of a product section before it is turned (P) and after it is turned (P') by 180° about an axis (A0) which is perpendicular to the plane of the product and passes through its centre. The same result is obtained by performing a rotation of 180° of the frame (49) about the axis A5 after winding the section (P) around the storage cylinder (40) and then unwinding this same section onto a receiving station (6) or a building drum.

The support (50) is mounted on a frame (51) of a movable carriage (5) displaced in the direction perpendicular to the direction of supply (L). This carriage has guide wheels (52) and motorised wheels (53) displaced respectively on rails (54) and a roll track (55). The carriage allows the transfer and storage system to be positioned opposite the cutting tool (3) and the storage bobbin (2) from which a product section is to be drawn off. After this section has been loaded around the storage cylinder, the transverse displacement of the carriage to a predetermined position opposite the receiving station (6) or the drum (7) allows the product section to be unloaded onto the receiving station or the drum, pre-positioning it before it is deposited definitively onto the drum (7).

Figure 3:
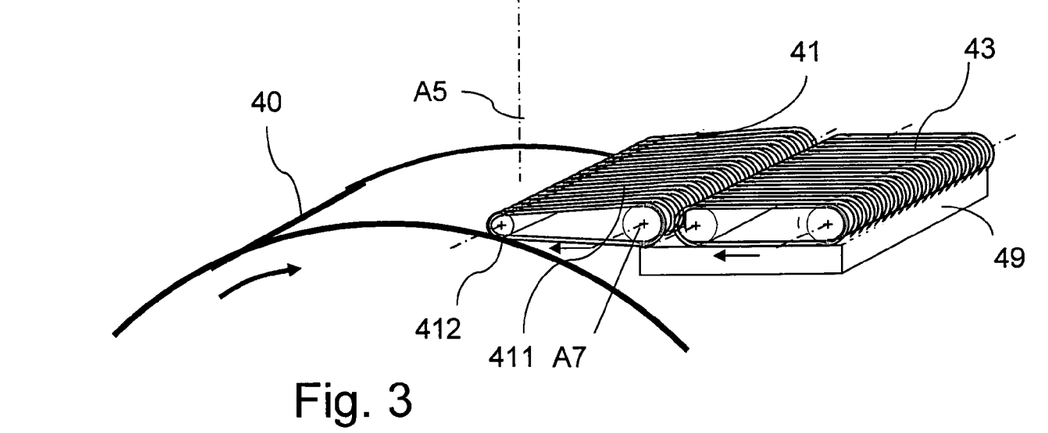
FIGS. 3 and 4 are diagrammatic perspective views of a switching device.
Figure 4:
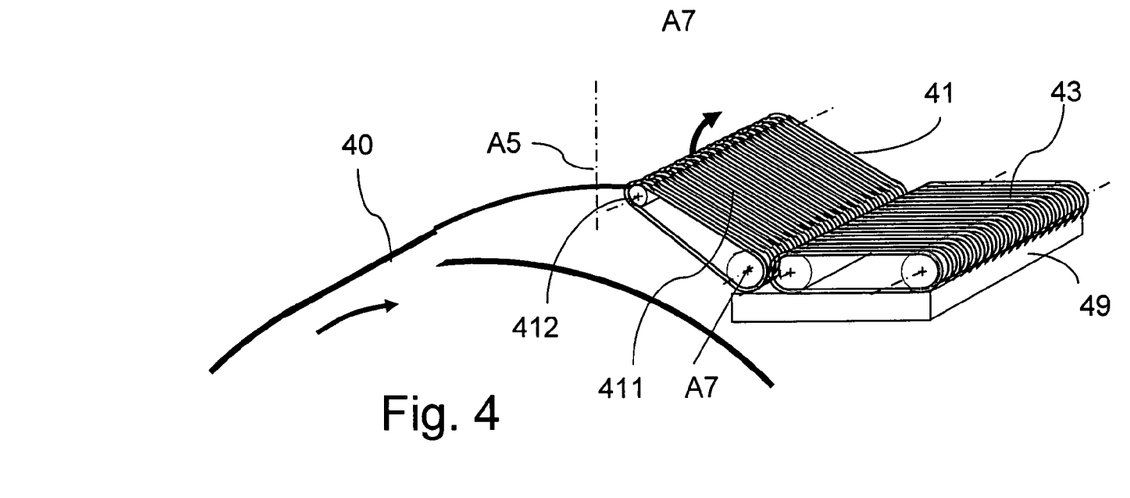

A switching device system (41 and 42) allows winding and unwinding of the product section around the cylinder (40) to be facilitated. FIGS. 3 and 4 illustrate a switching device according to the invention. The arm (41) is mounted to pivot about an axis (A7) which is integrally formed on the frame (49) and parallel to the axis of rotation (A4) of the cylinder. It is equipped with an endless conveyor belt (411) driven by a motor (not illustrated) and circulating in a direction perpendicular to the axis of pivoting (A7). In the closed position, as represented in FIG. 3, the end of the arm (412) is brought close to the surface of the cylinder (40). Here, the term "close" is understood to be the smallest possible distance allowing contact between the end of the arm (412) and the surface of the storage cylinder to be avoided while ensuring that a product section is transferred from the surface of the storage cylinder to the conveyor belt (411) of the storage arm (41) without harming the product. In the open position, as illustrated in FIG. 4, the free end (412) of the arm is at a distance from the surface of the cylinder (40). This distance must be large enough to allow a product section deposited on the surface of the cylinder to circulate freely.

The storage device serving as a support in the present description has two arms (41 and 42) arranged opposite one another on either side of the storage cylinder and each equipped with a conveyor belt (411 and 421). This arrangement has proved particularly effective when the intention is to turn the product sections, as the switching devices (41 and 42) are alternately positioned at the entry point and exit point of the storage and transfer device.

Conveyor belts (43, 44) fixed to the frame (49) ensure that the product section is transferred at the entry point or exit point of the transfer and storage device (4) and circulate in the same direction as the conveyor belts with which the pivotal arms (41 and 42) they adjoin are equipped.

Downstream of the storage and transfer device (4) is arranged a receiving station (6) formed by a bench (61) having for example a set of rolls mounted to rotate about transverse axes; these rolls may be free or motorised, as desired. The bench (61) of the receiving station is mounted on a frame (63) and may be lifted with the aid of a jack (62) to leave free the course travelled by the transfer and storage device (4) when it is rotated about the axis A5.

The drum (7) onto which the product sections are wound one after the other using predetermined procedures and equipment is placed at the exit point of the receiving station. The drum (7) is mounted to rotate on a frame (70) about a horizontal axis (A6) perpendicular to the axis of supply (L).

The installation (1) also comprises a control unit (8) which controls, in particular:
  unwinding and rewinding of the storage bobbin (2);
  circulation of the conveyor belts (25, 35, 44, 421, 411, 43, 61), with adjustment of their respective linear speeds;
  transverse displacement of the cutting tool (30) and the carriage (5);
  measurement of the length of the strip;
  actuation of the cutting tool (3);
  driving of the storage cylinder (40) and adjustment of its tangential speed;
  regulation of the tension of the flexible strip (47, 48);
  pivoting of the arms of the switching device system (41, 42);
  lifting of the bench of the receiving station (6);
  turning of the frame (49) about the axis A5;
  rotation of the drum (7).

The result is the automation of a number of the operations for handling the product strips, in particular supplying them from the storage bobbins (2), cutting them into product sections and transporting and turning the sections to bring them close to the building drum (7).

The variants on installation are numerous and may contribute to management of the transfer and storage device (4).

Thus, a first variant (not illustrated) consists in fixing the cutting tool (3) to the frame (49) of the transfer and storage device, with the carriage (5) ensuring transverse displacement simultaneously of the frame (49) and the cutting tool and the associated conveyor belts (35).

It is also possible, if it proves necessary to turn product sections which are symmetrical and if the mass of these sections is not excessive, to use a storage cylinder equipped with a magnetic system, if the products to be handled contain metal elements, or a pneumatic system allowing the product sections to be held on the surface of the transfer cylinder by negative pressure.

Similarly, if the number of products to be laid is small, it may prove advantageous to hold the frame (49) in a fixed position about the axis A5 and to supply from two different bobbins products which, once they have been laid, are symmetrical with respect to the plane perpendicular to the axis of the drum and passing through its centre. In this case, if the nature of the products to be handled lends itself thereto, it may only be necessary to use a single switching device (41) located at the exit point of the transfer and storage device.

It is also possible to envisage the product being in the form of a strip which has already been cut up into sections of predetermined length. In this case, the supply station and the transfer means located upstream of the transfer and storage station are adapted to bring these pre-cut sections directly to the process of transfer and storage where the turning is performed, if necessary, and then to unload the product section to a defined transverse position on the receiving station or the drum.

When the number of sections to be laid becomes significant, the use of a second handling and storage device (4') as illustrated in FIG. 1 or a plurality of such devices may contribute to making an improvement to the performance of the installation.

It is also possible to omit the receiving station. In this case, the product sections are deposited directly from the transfer and storage device (4) onto the drum (7).

Similarly, instead of being aligned side by side, the supply stations may be distributed around a rotary conveyor which is actuated in order to bring the selected supply station(s) opposite the transfer and storage device(s).

It is also possible to provide for a plurality of product sections arranged parallel to one another to be stored in the transfer device (4). These sections may come from a single storage bobbin or different storage bobbins. By making a few minor modifications to the transfer and storage device it is possible to introduce these sections into the storage device successively and to draw them off one after the other, towards the receiving station, in different transverse positions. All that needs to be done for this is to equip the storage device with a plurality of switching device systems as described above, arranged side by side and parallel to the axis of revolution of the storage cylinder, with each switching device system being actuated independently of the adjacent storage system in order to enable a section to be transferred to the storage device or from the storage device at the same time. It goes without saying that the width of the storage cylinder (40) is adjusted accordingly.

Figure 6:
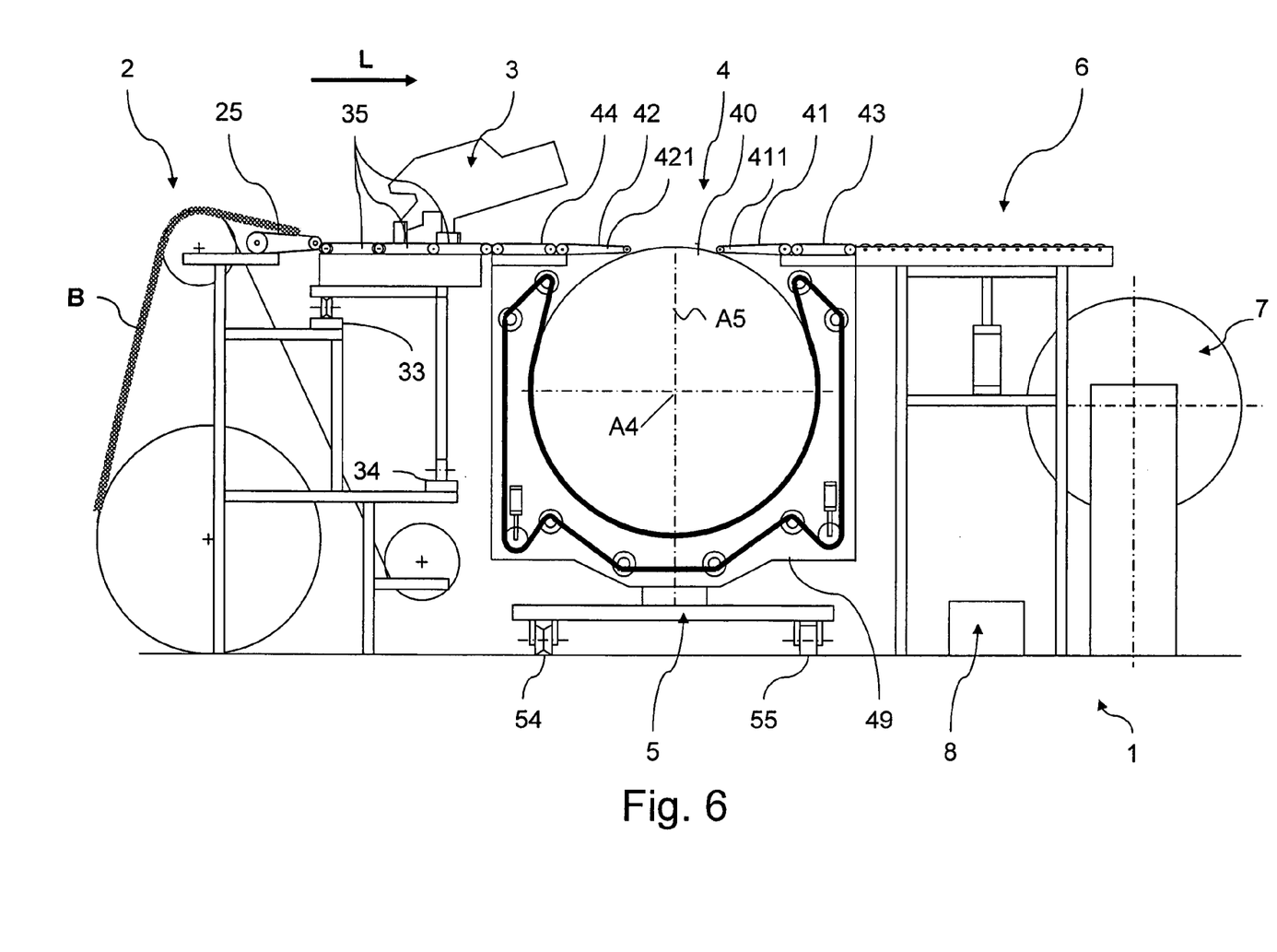
FIGS. 6 to 11 are views similar to FIG. 2, illustrating the installation during operation, and illustrating the successive steps of a process for making tyres which makes use of a device according to the invention.
Figure 7:
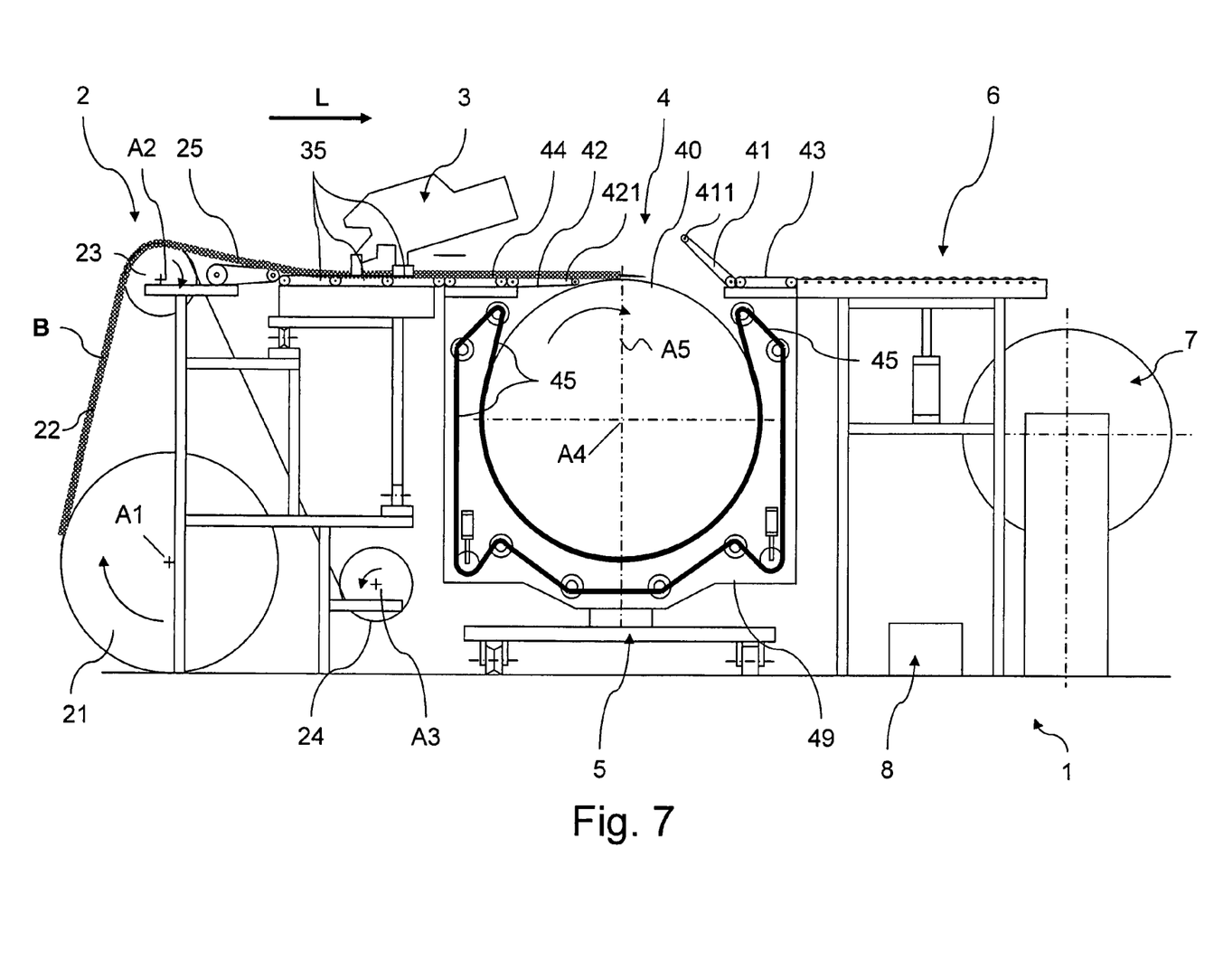

By way of illustration, the process making use of an installation (1) comprising a handling and storage device (4) of this kind comprises the steps described below and illustrated in FIGS. 6 to 11:
  With reference to FIG. 6, as a function of how far assembly of the products of the tyre cover being made has advanced, the supply station (2) capable of delivering the strip of material B intended for laying on the building drum (7) is selected.
  Then the cutting tool (3) and the carriage (5) supporting the storage device (4) are moved on their respective circulation tracks (33, 34, 54, 55) in order to come into position opposite the selected supply station (2). The arms (42 and 41) are lowered. The conveyor belts (25, 35, 44 and 421) form an extension of one another in order to create a single conveying path.
  With reference to FIG. 7, the arm (41) is then lifted and a length of strip B is transferred in the direction of supply (L) from the supply station (2) to the storage device (4), passing perpendicular with respect to the cutting tool (3). To this end, the storage bobbin (21) is unwound, the backing element strip (22) then being wound onto the recovery spool (24), while the product strip B circulates successively on the conveyor belts (25, 35, 44 and 421). The cylinder (40) is driven in rotation about its axis A4 and in turn drives the flexible strip (45) by friction. The strip of material B comes up against the upper surface of the cylinder (40), following its rotation by passing along the course left free between the end of the arm (41) and the surface of the cylinder (40). The strip of product B then comes into engagement with the flexible strip (45), which holds it flat against the cylinder (40) and drives it by friction together with the storage cylinder (40), to ensure that it is wound around the latter.

Figure 8:
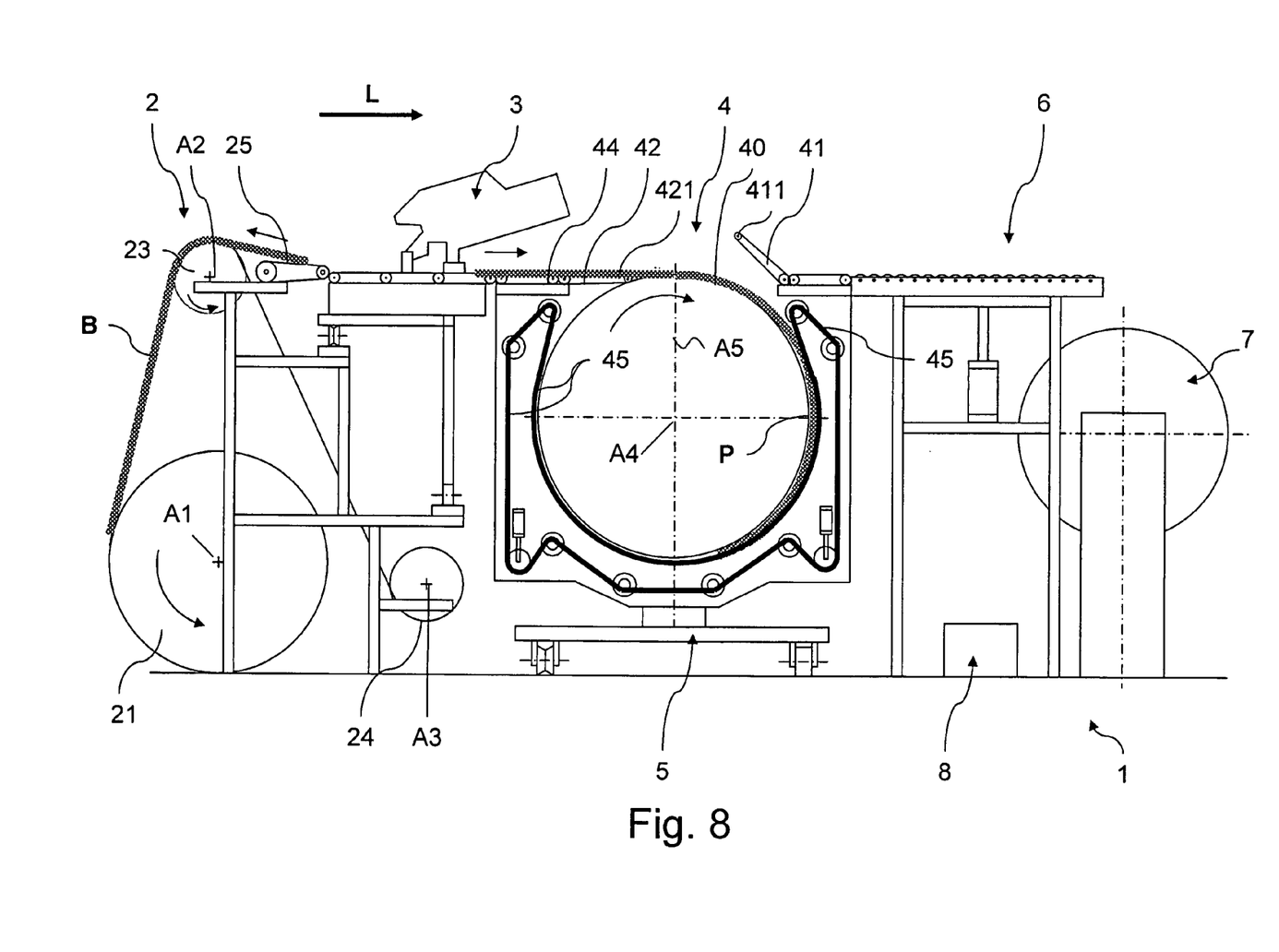

With reference to FIG. 8, when the unwound length corresponds to the length desired, the cutting tool (3) is actuated to create a section (P), which continues to be wound around the storage cylinder (40) until the product section (P) is captured in its entirety between the flexible strip (45) and the cylinder (40). So that the transverse movement of the cutting tool is not impeded, a brief rewinding of the strip of material B onto its storage bobbin is performed, until the free end of the strip B rests on the conveyor belt (25).

Figure 9:
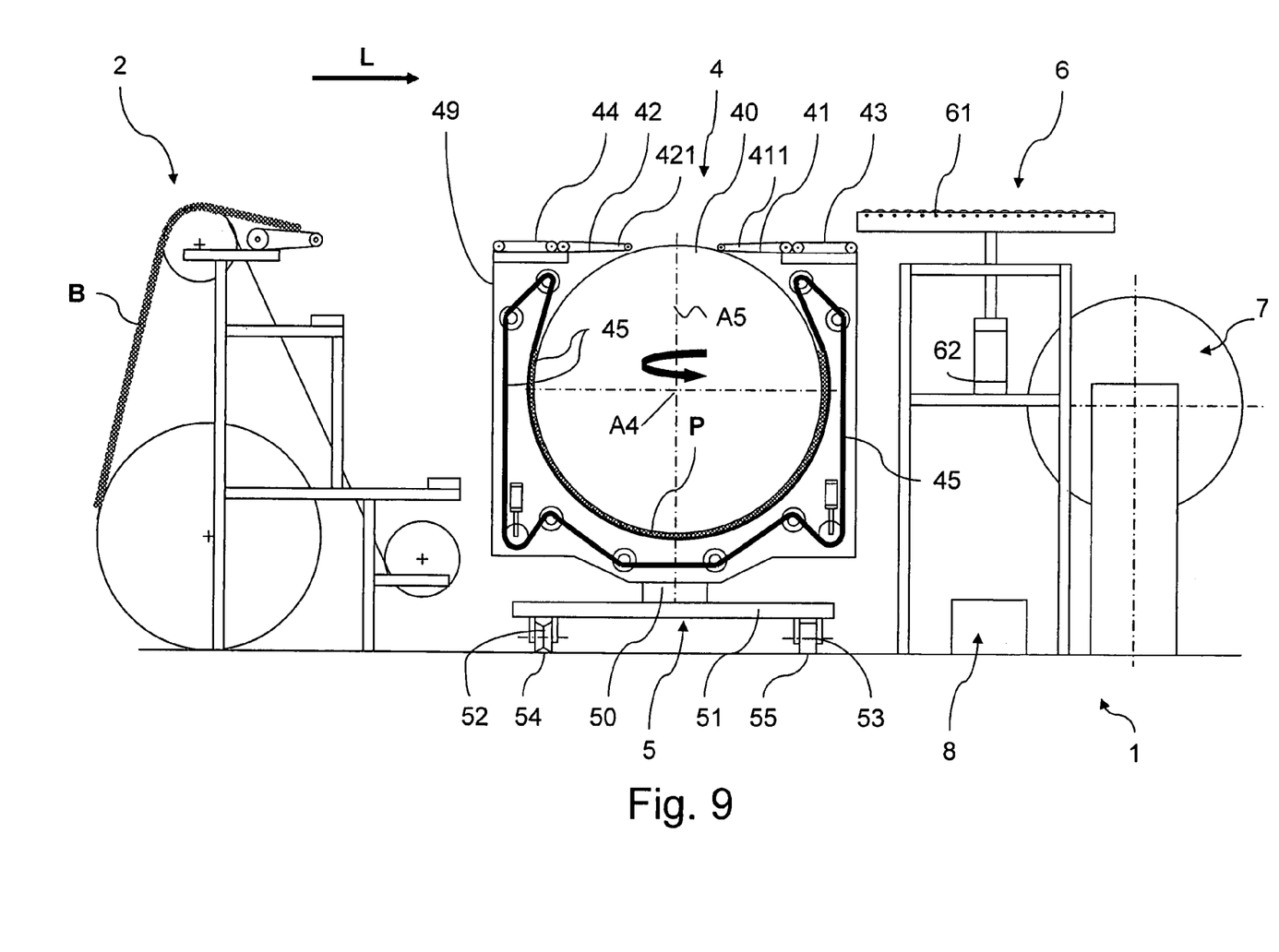

With reference to FIG. 9, the cutting tool (3) is moved transversely and comes into position opposite another supply station. The arm (41) is lowered and the storage and transfer system (4) can then be brought opposite the receiving station (6) by moving the carriage (5) on its rails (54 and 55). The transverse position will be selected appropriately in order to pre-position the product section (P).

Should it prove necessary, the frame (49) is pivoted by 180° about the axis A5 so that the product section is turned. In order to free sufficient space to allow this turning, the bench (61) of the receiving station (6) may be lifted further for a moment with the aid of the jack (62). Care should also be taken that the frame (49) is not opposite the cutting station (3) during this operation.

Figure 10:
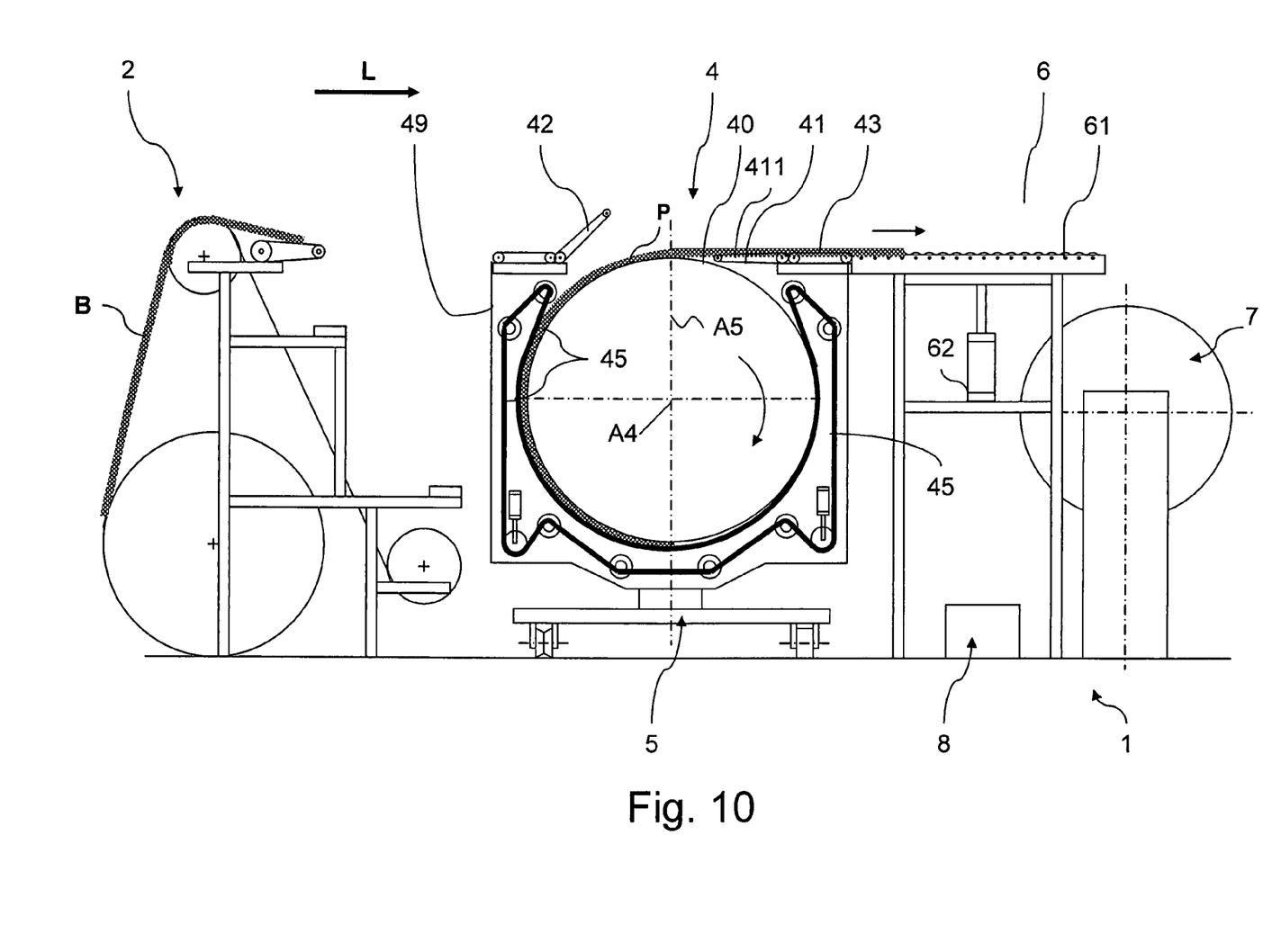

With reference to FIG. 10, the arm (42) is lifted and the bench (61) of the receiving station (6) is realigned with the conveyor (43) of the storage and transfer station. The cylinder (40) is rotated and the section (P) is drawn off the transfer and storage device, circulating on the conveyor belts (411, 43), and then transferred to the bench (61) of the receiving station (6).

Figure 11:
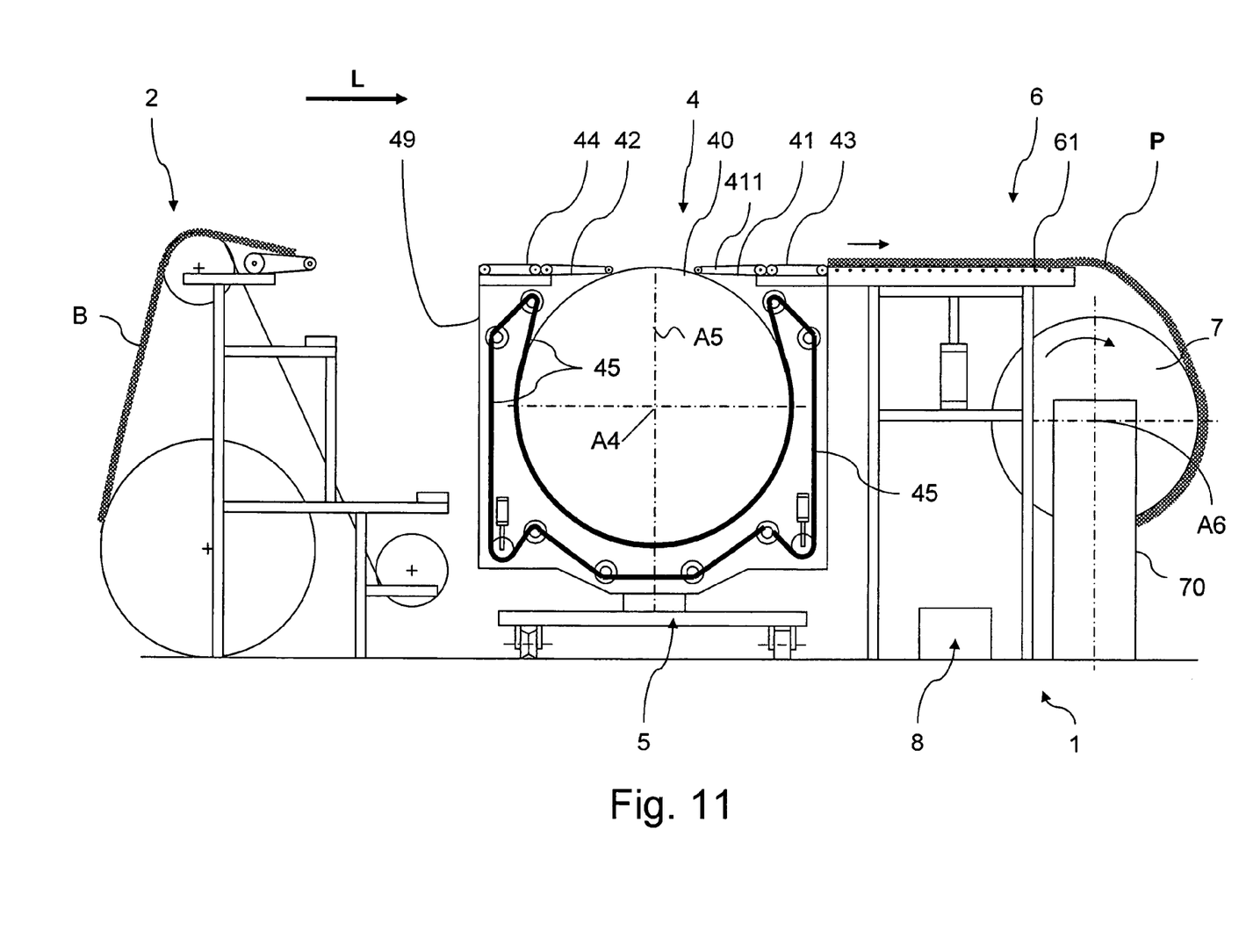

With reference to FIG. 11, the section (P) is finally deposited on the building drum (7) before being rotated.

The arm (42) is lowered and the installation is then ready to perform the transfer of a new product section.

The invention claimed is:

1. A device for storing and transferring rubber strip sections for making a tire cover, comprising a storage cylinder mounted for rotation about a substantially horizontal axis of revolution on a frame, the frame mounted on a support for rotation about a substantially vertical axis, the support being mounted on a movable carriage said device including a flexible strip forming a closed loop and movable around part of the cylinder, and a set of guides for guiding the flexible strip, with the cylinder and the flexible strip arranged for clamping and frictionally driving a rubber strip section held between the cylinder and the flexible strip to wind the rubber strip section around the cylinder.

2. A storage and transfer device according to claim 1, wherein the movable carriage is guided movably along a rail.

3. A storage and transfer device according to claim 1, wherein the movable carriage carries a cutting tool disposed upstream of the storage cylinder with reference to a direction of movement of the rubber strip sections.

4. A storage and transfer device according to claim 1, further including a switching device for driving a strip section to and from the storage cylinder.

5. A storage and transfer device according to claim 4, wherein the switching device comprises at least one movable arm mounted to pivot on the frame about an axis oriented parallel to the axis of rotation of the storage cylinder between: a closed position, in which a free end of the arm is brought close to the surface of the storage cylinder, and an open position, in which the free end is at a distance from the surface of the storage cylinder.

6. A storage and transfer device according to claim 5, wherein the arm includes an endless conveyor belt circulating in a direction perpendicular to the pivot axis of the arm.

7. A storage and transfer device according to claim 4, wherein the switching device includes two movable arms arranged opposite one another on respective sides of the storage cylinder.

8. A storage and transfer device according to claim 1, further including a tensioning mechanism for holding the flexible strip at constant tension.

9. A storage and transfer device according to claim 1 wherein the storage cylinder is motor-driven and frictionally drives the flexible strip.

10. A storage and transfer device according to claim 1 wherein the substantially horizontal and vertical axes intersect one another.

11. A tire-making facility comprising:
a plurality of supply stations arranged adjacent one another in a row, the supply stations containing respective rubber sections for making a tire,
a tire-building site,
a storage-and-transfer device movable along the row of supply stations between the tire building site and the row of supply stations, the device including:
a movable carriage,
a frame mounted on the carriage for rotation about a substantially vertical axis, and
a storage cylinder mounted on the frame for rotation about a substantially horizontal axis for storing a rubber section thereon,
wherein the carriage is movable to positions enabling the storage-and-transfer device to receive a rubber section from a selected supply station onto the storage cylinder and transfer the rubber section to the tire-building site from the storage cylinder after rotating the frame by about 180 degrees about the substantially vertical axis.

12. The tire-making facility according to claim 11 wherein the substantially horizontal and vertical axes intersect one another.

13. A process for making tires utilizing a device for storing and transferring rubber sections for making a tire, the device including a frame rotatable about a substantially vertical first axis, and a storage cylinder mounted on the frame for rotation about a substantially horizontal second axis, the process comprising the steps of:
A. winding from a supply station a rubber section of predetermined length around the storage cylinder while rotating the storage cylinder about the second axis,
B. pivoting the frame by about 180 degrees about the first axis,
C. moving the frame on a movable carriage relative to the supply station for positioning the device opposite a tire building site, and
D. subsequent to steps B and C unwinding the rubber section from the storage cylinder and transferring the rubber section to the tire-building site.

14. The process according to claim 13 wherein step A includes positioning the frame adjacent a selected one of a number of supply stations, and step C comprises moving the frame from the selected supply station to a location opposite the tire building site.

15. A process for making tires utilizing a device for storing and transferring rubber sections for making a tire, the device including a frame rotatable about a substantially vertical first axis, and a storage cylinder mounted on the frame for rotation about a substantially horizontal second axis, the process comprising the steps of:
  A. winding from a supply station a rubber section of predetermined length around the storage cylinder while rotating the storage cylinder about the second axis which intersects the storage cylinder and the first axis,
  B. pivoting the frame by about 180 degrees about the first axis which intersects the second axis at the mid-line of the storage cylinder,
  C. positioning the device opposite a tire building site, and
  D. subsequent to steps B and C unwinding the rubber section from the storage cylinder and transferring the rubber section to the tire-building site.

\* \* \* \* \*

UNITED STATES PATENT AND TRADEMARK OFFICE
CERTIFICATE OF CORRECTION

| | | |
|---|---|---|
| PATENT NO. | : 7,351,299 B2 | Page 1 of 1 |
| APPLICATION NO. | : 10/971016 | |
| DATED | : April 1, 2008 | |
| INVENTOR(S) | : Fidel Aito Bardaji Zuriarrain et al. | |

It is certified that error appears in the above-identified patent and that said Letters Patent is hereby corrected as shown below:

On the Title Page Item (63)
Under Related U.S. Application, "April 23, 2003" should read --April 10, 2003--.

Signed and Sealed this

Twenty-third Day of September, 2008

JON W. DUDAS
*Director of the United States Patent and Trademark Office*